United States Patent
Bhattacharja et al.

(10) Patent No.: US 10,882,998 B2
(45) Date of Patent: Jan. 5, 2021

(54) ENHANCING RELEASE OF BULK SOLIDS FROM A SURFACE

(71) Applicant: Ecolab USA Inc., St. Paul, MN (US)

(72) Inventors: Sankar Bhattacharja, Naperville, IL (US); John Cranfill, III, Lexington, KY (US); Ollie O'Neal, Jr., Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 156 days.

(21) Appl. No.: 15/814,648

(22) Filed: Nov. 16, 2017

(65) Prior Publication Data

US 2018/0142102 A1 May 24, 2018

Related U.S. Application Data

(60) Provisional application No. 62/423,863, filed on Nov. 18, 2016.

(51) Int. Cl.
| | | |
|---|---|---|
| *C09D 5/02* | (2006.01) | |
| *C11D 3/37* | (2006.01) | |
| *C11D 3/18* | (2006.01) | |
| *C11D 3/20* | (2006.01) | |
| *C11D 11/00* | (2006.01) | |
| *B05D 1/02* | (2006.01) | |

(52) U.S. Cl.
CPC ............... *C09D 5/022* (2013.01); *B05D 1/02* (2013.01); *C11D 3/18* (2013.01); *C11D 3/2079* (2013.01); *C11D 3/373* (2013.01); *C11D 11/0041* (2013.01)

(58) Field of Classification Search
None
See application file for complete search history.

(56) References Cited

U.S. PATENT DOCUMENTS

| | | |
|---|---|---|
| 3,797,707 A | 3/1974 | Jenike et al. |
| 4,312,901 A | 1/1982 | Kekish et al. |
| 4,421,791 A | 12/1983 | Kekish et al. |
| 4,425,381 A | 1/1984 | Walsh |
| 4,561,905 A | 12/1985 | Kittle |
| 4,630,755 A | 12/1986 | Campbell |
| 4,715,962 A | 12/1987 | Bhattacharyya et al. |
| 5,037,678 A | 8/1991 | Kinkelaar |
| 5,186,979 A | 2/1993 | Ballenger, Jr. et al. |
| 5,330,671 A | 7/1994 | Pullen et al. |
| 5,527,482 A | 6/1996 | Pullen et al. |
| 5,876,622 A | 3/1999 | Pullen et al. |
| 5,958,287 A | 9/1999 | Pullen |
| 6,124,366 A | 9/2000 | Pullen et al. |
| 6,143,812 A | 11/2000 | Martin et al. |
| 6,433,053 B1 * | 8/2002 | Kasturi ............... C11D 3/18 428/537.5 |
| 6,486,249 B1 | 11/2002 | Dituro et al. |
| 7,033,422 B2 | 4/2006 | Bloomer |
| 7,648,487 B2 | 1/2010 | Ito et al. |
| 8,974,590 B2 | 3/2015 | Russell et al. |
| 2004/0206931 A1 * | 10/2004 | Bloomer ............... B60P 1/286 252/70 |
| 2005/0171251 A1 * | 8/2005 | Nakajima ............... C08L 95/00 524/59 |
| 2006/0083879 A1 | 4/2006 | Brewis et al. |
| 2008/0028977 A1 * | 2/2008 | Bingeman .......... C09K 19/0422 106/2 |
| 2014/0275337 A1 * | 9/2014 | Svec ..................... B01F 7/042 523/344 |
| 2015/0166274 A1 * | 6/2015 | Swearingen ........... B65G 67/02 414/341 |
| 2015/0239005 A1 * | 8/2015 | Humphreys ............... E04D 1/20 428/489 |

FOREIGN PATENT DOCUMENTS

| | | |
|---|---|---|
| EP | 0998984 A2 | 5/2000 |
| GB | 745024 A | 2/1956 |
| GB | 756436 A | 9/1956 |

OTHER PUBLICATIONS

European Patent Office, International Search Report in International Patent Application No. PCT/US2017/061924, dated Feb. 20, 2018, 5 pp.
European Patent Office, Written Opinion in International Patent Application No. PCT/US2017/061924, dated Feb. 20, 2018, 6 pp.

* cited by examiner

*Primary Examiner* — Shamim Ahmed
*Assistant Examiner* — Bradford M Gates
(74) *Attorney, Agent, or Firm* — Kagan Binder, PLLC

(57) ABSTRACT

Methods of enhancing release of bulk solids from a surface are provided. The methods comprise wetting the surface with a substance comprising water, a fatty acid, an emulsifier, and a carrier oil. The carrier oil may be selected from mineral oil, silicone oil, and combinations thereof. The fatty acid may be tall oil fatty acid. The substance may be formed from diluting a concentrate with water. The substance may be applied to the surface at a dose of from about 0.1 gallons to about 50 gallons of the substance per about 2000 square feet of surface, thereby wetting the surface.

13 Claims, No Drawings

ENHANCING RELEASE OF BULK SOLIDS FROM A SURFACE

This application is a nonprovisional application claiming the benefit of U.S. Provisional Patent Application Ser. No. 62/423,863, filed Nov. 18, 2016, the disclosure of which is incorporated herein by reference in its entirety.

BACKGROUND OF THE INVENTION

Storage and transportation of bulk solids generally involves the bulk solids, or portion thereof, to contact one or more surfaces, which can result in adherence of bulk solids to the surface. Often the surface is an inner surface of a bin or hopper, where adherence of bulk solids can result in manual removal of the adhering bulk solids, or "carryback" of the adhering bulk solids instead of delivery to the user. A need exists for an offering that can enhance release of bulk solids from a surface.

BRIEF SUMMARY OF THE INVENTION

Provided herein are methods of enhancing release of bulk solids from a surface. In an embodiment, the method comprises wetting the surface with a substance comprising water, a fatty acid, an emulsifier, and a carrier oil. The method may further comprise diluting a concentrate comprising a fatty acid, an emulsifier, and a carrier oil with water to form a substance, and wetting the surface with the substance.

DETAILED DESCRIPTION OF THE INVENTION

Provided herein are methods of enhancing release of bulk solids from a surface. In an embodiment, the method comprises wetting the surface with a substance comprising water, a fatty acid, an emulsifier, and a carrier oil. The method may further comprise diluting a concentrate comprising a fatty acid, an emulsifier, and a carrier oil with water to form a substance, and wetting the surface with the substance.

The methods provided herein enhance the release of bulk solids from a surface. Generally, bulk solids are solid materials that are generally flowable that can be stored in bins. The term "generally flowable" is used to indicate that the solid materials generally are not fixed in one place, but are pourable and/or dumpable. Bulk solids can take the form of relatively small fluidized particles to relatively large crystals and/or aggregate chunks, and solid materials that fall in between (e.g., granular material). Examples of bulk solids include but are not limited to ore (including iron ore, coal, bauxite, etc.), stone, gravel, sand, dirt, aggregate, salt, fertilizer, grain, lime (e.g., hydrated and otherwise), alumina, copper, biomass pellets, gypsum, and combinations thereof. Bulk solids are generally transported and stored loose, but could be packed.

Bulk solids can be defined as, for example, organic-dominant, inorganic-dominant, manufactured, or agricultural. Generally, organic-dominant bulk solids are earthen (i.e., non-agricultural and non-manufactured) bulk solids that are capable of being utilized as fuel. An example of organic-dominant bulk solids is coal.

Generally, inorganic-dominant bulk solids are earthen (i.e., non-agricultural and non-manufactured) bulk solids that are not utilized as fuel. Examples of inorganic-dominant bulk solids include but are not limited to metal (e.g., iron) ore, bauxite, stone, gravel, sand, dirt, phosphate rock, aggregate, salt, lime, gypsum, and combinations thereof.

Generally, manufactured bulk solids are bulk solids that have been formed by industry (i.e., non-earthen) in such a manner that involves an alteration of chemical form, e.g., chemical reaction, purification, formulation, and the like. Bulk solids do not become manufactured bulk solids by their mere reduction in size. For example, gravel that has been crushed from larger stone is not "manufactured" as used herein. Examples of manufactured bulk solids include but are not limited to fertilizer, thermoplastic polymer pellets, alumina, copper, biomass pellets, hydrated lime, and combinations thereof.

Generally, agricultural bulk solids are vegetative (i.e., non-earthen) solids that have been harvested. Examples of agricultural bulk solids include grain, animal feed, seed, and combinations thereof.

In certain embodiments of the methods provided herein, the bulk solids comprise at least one of inorganic-dominant bulk solids, manufactured bulk solids, and agricultural bulk solids. In certain embodiments of the methods provided herein, the bulk solids are organic-dominant bulk solids.

For the methods provided herein, the bulk solids contact a surface and can be difficult to release from the surface. For example, bulk solids can tend to adhere to a surface at times when the bulk solids should slide down the surface. Adherence by bulk solids to a surface can cause inefficiencies in handling the bulk solids. Ideally, bulk solids will flow when they are supposed to flow without adhering to one or more surfaces in contact with the bulk solids.

Surfaces that can be wetted according to the methods provided herein include, for example, an interior surface of a bulk solids container, a surface of a chute, a surface of a feeder, a surface of a conveyor belt, and combinations thereof. As it is used herein, a chute may be open (e.g., a slide) or closed (e.g., a conduit). For example, a chute may have a surface that contacts bulk solids, and the surface may be wetted with a substance as described herein generally prior to coming into contact with the bulk solids.

In certain embodiments of the methods provided herein, an interior surface of a bulk solids container is wetted with a substance as described herein. In certain embodiments, the bulk solids container is stationary (e.g., a bulk solids bin). In certain embodiments, the bulk solids container is mobile. For example, the bulk solids container may be a dump truck bed or a truck trailer bed. The bulk solids container may be a hopper, including a hopper rail car. In certain embodiments, the bulk solids container is mobile and comprises less than two railway couplers.

In certain embodiments of the methods provided herein, the surface is constructed of one of metal, polymer, glass, ceramic, and combinations thereof. In certain embodiments of the methods provided herein, the metal is an alloy, though the metal may instead be a pure metal (e.g., iron, aluminum, titanium, etc.). In certain embodiments of the methods provided herein, the surface is constructed of a metal alloy selected from an iron-containing alloy, an aluminum-containing alloy, and a titanium-containing alloy. In certain embodiments of the methods provided herein, the metal alloy is steel. In certain embodiments of the methods provided herein, the surface is constructed of steel selected from carbon steel, black steel, stainless steel, a hybrid or exotic steel alloy (e.g., low-alloy and high-strength low-alloy steels, tempered steels, etc.), and the like.

For the methods provided herein, the surface is wetted by the substance. Generally, the surface is wetted in locations that contact bulk solids, though one may choose to wet more or less of the surface. A surface may be wetted by, for example, spraying the substance onto the surface. While the surface may be wetted after contacting the surface with the bulk solids, in certain embodiments of the methods provided herein, the surface is wetted prior to being contacted by the bulk solids. In other words, in certain embodiments, the method further comprises contacting the wetted surface with bulk solids.

The substance that wets the surface is generally a liquid. The term "liquid" is to be understood to describe a sprayable or coatable substance. The substance comprises water, a fatty acid, an emulsifier, and a carrier oil. In certain embodiments of the methods provided herein, the substance is formed by diluting a concentrate comprising a fatty acid, an emulsifier, and a carrier oil with water. When utilized, the concentrate may comprise the non-water ingredients and optionally an amount of water that is less than the amount of water present in the substance that wets the surface. In certain embodiments of the methods provided herein, the concentrate comprises from about 70 wt % to about 90 wt % carrier oil, from about 2 wt % to about 10 wt % fatty acid, from about 2 wt % to about 15 wt % emulsifier, and from 0 wt % to about 3 wt % water. In certain embodiments of the methods provided herein, the concentrate is diluted to form the substance. The concentrate may be diluted with water at any suitable ratio, for example, at a ratio of from 1:1 to 100:1 water-to-concentrate, including from 1:1, or from 2:1, or from 3:1, to 100:1, or to 50:1, or to 20:1, or to 10:1 (weight:weight or volume:volume).

In certain embodiments of the methods provided herein, the substance used to wet the surface (and precursors thereof, e.g., concentrate) comprises a carrier oil. The carrier oil is an important ingredient of the substance and is generally present in the substance at a relatively high concentration (e.g., from about 10 wt % to about 20 wt % of the substance, and from about 70 wt % to about 90 wt % in the concentrate). The carrier oil provides utility to the substance as a key ingredient to enhancing release of bulk solids from the surface. While any suitable carrier oil is contemplated, mineral oil and silicone oil have each been found to provide beneficial results. In certain embodiments of the methods provided herein, the carrier oil comprises at least one of mineral oil and silicone oil. In certain embodiments of the methods provided herein, the carrier oil is mineral oil. In certain embodiments of the methods provided herein, the carrier oil is silicone oil.

In certain embodiments of the methods provided herein, the substance comprises from about 10 wt % to about 20 wt % carrier oil, including from about 10 wt %, or from about 11 wt %, or from about 12 wt %, to about 20 wt %, or to about 19 wt %, or to about 18 wt % carrier oil. In certain embodiments of the methods provided herein, the concentrate comprises from about 70 wt % to about 90 wt % carrier oil, including from about 70 wt %, or from about 72 wt %, or from about 74 wt %, to about 90 wt %, or to about 88 wt %, or to about 86 wt % carrier oil.

In certain embodiments of the methods provided herein, the carrier oil is a natural oil, a synthetic oil, or a combination thereof. In certain embodiments of the methods provided herein, the carrier oil is a hydrocarbon oil, a non-hydrocarbon oil, or a combination thereof. The carrier oil may be of varying purity. In certain embodiments of the methods provided herein, the carrier oil is of relatively high purity, and in certain other embodiments of the methods provided herein, the carrier oil is of less than relatively high purity.

Generally, mineral oil (an example of a natural, hydrocarbon oil having from about 10 to about 60 carbon atoms) provides particularly beneficial functionality in enhancing release of bulk solids from a surface. In certain embodiments of the methods provided herein, the carrier oil comprises white mineral oil. In certain embodiments of the methods provided herein, the carrier oil is mineral oil, which in certain embodiments is white mineral oil. An example of white mineral oil is KRYSTOL 380 white mineral oil, available from Petro Canada.

Generally, silicone oil (an example of a synthetic, non-hydrocarbon oil) provides particularly beneficial functionality in enhancing release of bulk solids from a surface. For example, silicone oil having relatively low viscosity and a volatile content of less than about 0.03 wt % has provided beneficial results in enhancing release of bulk solids from a surface. In certain embodiments of the methods provided herein, the carrier oil is silicone oil, which in certain embodiments is low viscosity silicone oil (e.g., having a viscosity of from about 20 cSt to about 200 cSt), which additionally may have a volatile content of less than about 0.03 wt %. Examples of silicone oils are available from Dow Chemical.

In certain embodiments of the methods provided herein, the substance used to wet the surface (and precursors thereof, e.g., concentrate) comprises a fatty acid. Though generally present in a lesser amount than the carrier oil (e.g., from about 0.2 wt % to about 2 wt % fatty acid in the substance, and from about 2 wt % to about 10 wt % fatty acid in the concentrate), the fatty acid is an important ingredient of the substance. The fatty acid provides utility to the substance as a key ingredient to enhancing release of bulk solids from the surface. In certain embodiments of the methods provided herein, the fatty acid comprises a carbon chain of from about 6 to about 22 carbon atoms. In certain embodiments of the methods provided herein, the fatty acid has a relatively low acid number (e.g., less than about 205). In certain embodiments of the methods provided herein, the fatty acid has relatively low rosin content (e.g., less than about 2). While any suitable fatty acid is contemplated, tall oil fatty acid has been found to provide beneficial results. In certain embodiments of the methods provided herein, the fatty acid comprises tall oil fatty acid.

In certain embodiments of the methods provided herein, the substance comprises from about 0.2 wt % to about 2 wt % fatty acid, including from about 0.2 wt %, or from about 0.4 wt %, or from about 0.6 wt %, to about 2 wt %, or to about 1.8 wt %, or to about 1.6 wt % fatty acid. In certain embodiments of the methods provided herein, the concentrate comprises from about 2 wt % to about 10 wt % fatty acid, including from about 2 wt %, or from about 3 wt %, or from about 4 wt %, to about 10 wt %, or to about 8 wt %, or to about 7 wt % fatty acid.

In certain embodiments of the methods provided herein, the substance used to wet the surface (and precursors thereof, e.g., concentrate) comprises an emulsifier. Though generally present in a lesser amount than the carrier oil (e.g., from about 0.5 wt % to about 2.5 wt % emulsifier in the substance, and from about 2 wt % to about 15 wt % emulsifier in the concentrate), the emulsifier is an important ingredient of the substance. The emulsifier provides utility to the substance as a key ingredient to allow the fatty acid to emulsify in the carrier oil, or the carrier oil to emulsify in the water, thereby enhancing release of bulk solids from the surface. Any suitable emulsifier may be utilized in the substance. In certain embodiments of the methods provided herein, the emulsifier is a surfactant, which in certain embodiments is water-soluble or water-dispersible, and which can be nonionic, cationic, anionic, or zwitterionic. Examples of water-soluble or water-dispersible surfactants that are suitable emulsifiers include, but are not limited to, sorbitan fatty acid esters (e.g., sorbitan monooleate or sorbitan monolaurate), polyoxyethylene sorbitan fatty acid esters (e.g., fatty acid esters and laurate esters), alkoxylated alcohols (e.g., ethoxylated alcohol), fatty acids, alkoxylated fatty acids, alkoxylated alkylphenols, sulfates of oils, sulfates of fatty acids, sulfonates of oils, sulfonates of fatty acids, sucrose esters, glucose esters, aliphatic esters, ethoxylated aliphatic esters, glycerol esters, the like, multiples thereof, derivatives thereof, and combinations thereof. In certain embodiments of the methods provided herein, the water-soluble or water-dispersible surfactants are nonionic surfactants, for example, sorbitan fatty acid esters, polyoxyethylene sorbitan fatty acid esters, alkoxylated alcohols, the like, multiples thereof, derivatives thereof, and combinations thereof. In certain embodiments of the methods provided herein, the polyoxyethylene sorbitan fatty acid esters can be Tween 20, Tween 40, Tween 60 and Tween 80, while the sorbitan fatty acid esters can be Span 20, Span 40, Span 60 and Span 80, and combinations thereof.

The surfactant composition may be a solid or a liquid. The term "liquid" is used to describe a composition that comprises a liquid, which in certain embodiments is a solution, a slurry, an emulsion, a dispersion, and combinations thereof. In certain embodiments, the surfactant composition is a liquid, which in certain embodiments has an intrinsic viscosity of about 0.1 to about 1500 cPs.

Surfactants suitable for inclusion in the substance include, but are not limited to, anionic surfactants, cationic surfactants, zwitterionic surfactants, nonionic surfactants, and combinations thereof. Anionic surfactants include alkyl aryl sulfonates, sulfonates, paraffin sulfonates, alcohol sulfates, alcohol ether sulfates, alkyl carboxylates and alkyl ether carboxylates, alkyl and ethoxylated alkyl phosphate esters, and mono and dialkyl sulfosuccinates and sulfosuccinamates. Cationic surfactants include, but are not limited to, alkyl trimethyl quaternary ammonium salts, alkyl dimethyl benzyl quaternary ammonium salts, dialkyl dimethyl quaternary ammonium salts, and imidazolinium salts. Nonionic surfactants include, but are not limited to, alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopripionates and amphodipropionates, and alkyliminodiproprionate. Certain surfactants suitable for use in the substance comprise at least one of $C_{14-16}$ alpha olefin sulfonate and sodium dodecyl benzene sulfonate.

In certain embodiments of the methods provided herein, the surfactant includes at least one of a quaternary ammonium compound, an amine oxide, an ionic or non-ionic surfactant, and combinations thereof. Suitable quaternary ammonium compounds include, but are not limited to, alkyl benzyl ammonium salt; benzyl cocoalkyl($C_{12}$-$C_{18}$)dimethylammonium salt; dicocoalkyl ($C_{12}$-$C_{18}$)dimethylammonium salt; ditallow dimethylammonium salt; di(hydrogenated tallow alkyl)dimethyl quaternary ammonium methyl salt; methyl bis(2-hydroxyethyl cocoalkyl($C_{12}$-$C_{18}$) quaternary ammonium salt; dimethyl(2-ethyl) tallow ammonium methyl salt; n-dodecylbenzyldimethylammonium salt; n-octadecylbenzyldimethyl ammonium salt; n-dodecyltrimethylammonium salt; soya alkyltrimethylammonium salt; and hydrogenated tallow alkyl (2-ethylhyexyl) dimethyl quaternary ammonium methyl salt. Salts of the aforementioned compounds may be chlorides and/or sulfates.

Water soluble non-ionic monomers include, but are not limited to, acrylamide, N-substituted derivatives of acrylamide, hydroxyalkyl acrylates, and hydroxyalkyl methacrylates. Anionic monomers include, but are not limited to, salts of acrylic acid, methacrylic acid, ethacrylic acid, α-chloroacrylic acid, crotonic acid, itaconic acid, maleic acid, fumaric acid, vinyl sulfonic acid, and 2-acrylamido-2-methyl propane sulfonic acid. Cationic monomers include, but are not limited to, quaternary salts of dialkyl amino ethyl methacrylate, diallyl dimethyl ammonium chloride, vinyl benzyl-trimethyl ammonium chloride and the like. In certain embodiments of the methods provided herein, the nonionic monomers in the swellable polymer, which may be selected from acrylamide, N—N-dimethylacrylamide, 2-hydroxyethyl methacrylate, or a combination thereof.

In certain embodiments of the methods provided herein, the anionic monomers in the swellable polymer are an alkali (e.g., sodium) salt of a compound selected from acrylic acid, methacrylic acid, 2-acrylamido-2-methyl propane sulfonic acid, or a combination thereof. In certain embodiments of the methods provided herein, the cationic monomer in the swellable polymer is diallyl dimethyl ammonium chloride. The water swellable cross-linked polymer can be synthesized with compounds having two ethylenic groups copolymerizable with water soluble monomers. Exemplary cross-linkers include N—N'-methylene-bis-acrylamide, N,N'-methylene-bis-methacrylamide, an alkylidene-bis-acrylamide, divinyl benzene sulfonate, ethylene glycol diacrylate, ethylene glycol dimethacrylate, diallyl ethylene glycol ether, divinyl ester of polyethylene glycol (e.g., polyethylene glycol-600 diacrylate), divinyl ether of polyethylene glycol and the like difunctional monomers.

In certain embodiments, the surfactant composition includes a nonionic surfactant. In certain embodiments, the nonionic surfactant is a coco-n-alcohol amine or amide, which in certain embodiments is cocodiethanolamide.

In certain embodiments of the methods provided herein, the surfactant comprises a water soluble brancher. In certain embodiments of the methods provided herein, the surfactant comprises a cross-linking agent, which in certain embodiments is an adduct of glycerine and allyl glycidyl ether referred to herein as "B-brancher." Other types of branchers include the adducts of allylamine and a copolymer of maleic anhydride and methyl vinyl ether having differing mole ratios of allylamine to anhydrides, referred to herein as "A-branchers."

In certain embodiments of the methods provided herein, the surfactant includes a homopolymer or copolymer of diallyldimethyl ammonium chloride ("DADMAC"), such as described in U.S. Pat. No. 4,561,905, which is incorporated by reference herein in its entirety. The copolymers may contain from about 5 mole percent to about 30 mole percent of a water soluble anionic monomer. These copolymers may be referred to as polyampholytes. In certain embodiments of the methods provided herein, the anionic monomer is at least one of acrylic acid and methacrylic acid, which is sometimes denoted as (meth)acrylic acid. The polymers may have an Intrinsic Viscosity of at least 0.3, as measured in 1 M sodium nitrate at 30° C. The amount of water soluble anionic monomer polymerized with DADMAC may vary from as little as about 5 mole percent to as much as about 30 mole percent. While methacrylic and acrylic acid are examples of monomers for copolymerization with DADMAC, other anionic vinyl monomers may be utilized. Examples of such monomers are maleic acid, itaconic acid and fumaric acid. Furthermore, diluent monomers may be ter-polymerized with the DADMAC and the water soluble anionic monomer, and may be used in amounts of up to about 10 mole percent. Certain diluent monomers are the hydroxy $C_2$-$C_6$ alkyl acrylates and/or methacrylates. Other diluent monomers that may be utilized include, but are not limited to, acrylonitrile, acrylamide, styrene, vinyl acetate, and the like. The polymer containing the diluent monomers are attractive from the standpoint that most of the diluent monomers are inexpensive and in most cases do not materially detract from the activity of the DADMAC copolymer into which they have been incorporated. The copolymers and terpolymers of DADMAC as generally described above are illustrated in some detail in U.S. Pat. No. 4,715,962, the disclosure of which is incorporated by reference herein in its entirety. The polymer may be in the form of an aqueous solution or in the form of a water-in-oil emulsion, which in the presence of certain water soluble surfactant(s) invert into water and allow the polymer contained in the emulsion to dissolve rapidly. The dosage of the DADMAC polymer may be at least about 25 parts per million of polymer (i.e., grams of polymer per metric ton of metal-bearing material treated), or from about 50 parts per million to about 2,000 parts per million. The DADMAC polymer, including copolymer and terpolymer, may be in the form of an aqueous solution wherein the polymer content in the aqueous solution is from about 10 percent to about 50 percent by weight of the aqueous solution.

In certain embodiments of the methods provided herein, in addition to an emulsifier, the substance further comprises a high terpene-containing natural oil, such as described in U.S. Pat. Nos. 5,330,671; 5,527,482; 5,863,456; 5,876,622; 5,958,287; and 6,124,366, each of which is incorporated by reference herein in its entirety. Surfactant compositions including a surfactant compound and a high terpene-containing natural oil are marketed as part of DUSTFOAM suppression systems by Enviroflo Engineering, an Ecolab Company. High terpene-containing natural oils are those natural oils having a terpene content of at least about 50%. The high terpene-containing natural oil may contain at least about 90% terpene. Suitable high terpene-containing natural oils include, but are not limited to, citrus peel oil, which includes, but is not limited to, orange peel oil (i.e., orange oil), grapefruit peel oil (i.e., grapefruit oil), and lemon peel oil (i.e., lemon oil). Orange peel oil is a particular type of high terpene-containing natural oil and contains from about 90% to about 94% terpene. Pine oil is also a useful high terpene-containing natural oil.

When viewed in combination, the emulsifier and the high terpene-containing natural oil may include from about 1% to about 15% by weight high terpene-containing natural oil, or from about 8 to about 12% by weight, or from about 8 to about 10% by weight. The amount of high terpene-containing natural oil generally depends upon the amount of terpene in the high terpene-containing natural oil. For example, in the case of orange peel oil, the orange peel oil can be present in combination with the emulsifier in an amount of from about 1 to about 15% by weight of combined emulsifier and high terpene-containing natural oil, or from about 8% to about 10% by weight of combined emulsifier and high terpene-containing natural oil.

Conventional emulsifiers (e.g., surfactants) can be used in combination with the high terpene-containing natural oil, such as at least one of an anionic surfactant and a nonionic surfactant. For example, an anionic surfactant such as a salt of a fatty acid, an alkyl sulfate, an alkyl ether sulfonate, an alkyl aryl sulfonate, multiples thereof, and combinations thereof. Examples of certain surfactants include sodium dodecylbenzene sulfonate, sodium lauryl ether sulfate and salts such as a sodium salt of a secondary alkane sulfonate (e.g., Hostaspun SAS 60 marketed by Hoechst). Furthermore, the use of ethoxylated nonylphenols with, e.g., from about 8 to about 10 moles of ethylene oxide and/or ethoxylated octylphenols with, e.g., from about 8 to about 10 moles of ethylene oxide (e.g., alkylaryl polyglycol ether N9), may be utilized as well.

The substance may further comprise a variety of additives such as, for example, an antioxidant and/or a preservative. An example of a suitable antioxidant is butylated hydroxytoluene (i.e., 2,6-di-tert-butyl-para-cresol; "BHT"). The antioxidant may be present in the substance in an amount of from about 0.01% to about 1% by weight, or from about 0.08% to about 0.12% by weight. Suitable preservatives include, but are not limited to, formaldehyde, methylparaben, propylparaben, borax, and combinations thereof. The preservative may be present in the substance in an amount of from about 0.5% to about 5% by weight, or from about 0.8% to about 1.2% by weight.

In certain embodiments of the methods provided herein, the emulsifier is a combination emulsifier. A combination emulsifier is an emulsifier that comprises more than one species of emulsifier.

In certain embodiments of the methods provided herein, the substance comprises from about 0.5 wt % to about 2.5 wt % emulsifier, including from about 0.5 wt %, or from about 0.7 wt %, or from about 0.9 wt %, to about 2.5 wt %, or to about 2 wt %, or to about 1.8 wt % emulsifier. In certain embodiments of the methods provided herein, the concentrate comprises from about 2 wt % to about 15 wt % emulsifier, including from about 2 wt %, or from about 3 wt %, or from about 4 wt %, to about 15 wt %, or to about 14 wt %, or to about 13 wt % emulsifier.

In certain embodiments of the methods provided herein, the substance is applied to the surface at a dose of from about 0.1 gallon to about 50 gallons per about 2000 square feet of surface (i.e., from about 0.1 mL to about 1100 mL per about 1 square meter of surface), including from about 0.1 gallon, or from about 1 gallon, or from about 2 gallons, to about 50 gallons, or to about 30 gallons, or to about 20 gallons per about 2000 square feet of surface. In certain embodiments, the substance is applied to the interior surface of a hopper rail car at a dose of from about 1 gallon to about 20 gallons per hopper rail car.

EXAMPLES

The following examples further illustrate the invention but should not be construed as in any way limiting its scope.

Example 1

A stainless steel pan (an example of a surface) was utilized in this example. Approximately half of the pan was wetted with a substance as described herein. The substance comprised from about 40 wt % to about 90 wt % water, from about 10 wt % to about 20 wt % of white mineral oil, from about 0.2 wt % to about 2 wt % tall oil fatty acid, and from about 0.5 wt % to about 2.5 wt % emulsifier. Ground bauxite was placed in the pan such that the surface was entirely covered. The pan was lifted from the unwetted end to 60°

(i.e., 30° from vertical) and observed for movement of the bauxite. Some bauxite stuck to the unwetted half.

Example 2

The stainless steel pan of Example 1 (an example of a surface) was utilized in this example. Approximately half of the pan was wetted with a substance as described herein. The substance comprised from about 40 wt % to about 90 wt % water, from about 10 wt % to about 20 wt % of white mineral oil, from about 0.2 wt % to about 2 wt % tall oil fatty acid, and from about 0.5 wt % to about 2.5 wt % emulsifier (same as Example 1). Ground bauxite was placed in the pan such that the surface was entirely covered. The pan was lifted from the wetted end to 60° (i.e., 30° from vertical) and observed for movement of the bauxite. The bauxite from the wetted end slid cleanly to the unwetted end.

Example 3

Out of a total of 140 coal hopper railcars, the interior surfaces of 70 coal hopper railcars were wetted with about 7 gallons of substance as described herein per railcar. The coal hopper railcars were constructed of aluminum. The substance comprised from about 40 wt % to about 90 wt % water, from about 10 wt % to about 20 wt % of white mineral oil, from about 0.2 wt % to about 2 wt % tall oil fatty acid, and from about 0.5 wt % to about 2.5 wt % emulsifier (same as Example 1). The coal hopper railcars were loaded with coal, which was then transported approximately 800 miles to the location of delivery. During unloading, the seventy treated coal hopper railcars were noticeably easier to unload than the untreated railcars and resulted in little to no carryback.

Example 4

Out of a total of 110 coal hopper railcars, the interior surfaces of 55 coal hopper railcars were wetted with about 7 gallons of substance as described herein per railcar. The coal hopper railcars were constructed of steel. The substance comprised from about 40 wt % to about 90 wt % water, from about 10 wt % to about 20 wt % of white mineral oil, from about 0.2 wt % to about 2 wt % tall oil fatty acid, and from about 0.5 wt % to about 2.5 wt % emulsifier (same as Example 1). The coal hopper railcars were loaded with coal, which was then transported approximately 900 miles to the location of delivery. During offloading, of the 55 untreated coal hopper railcars, twenty cars had considerable amounts of carryback after unloading. Of the 55 treated coal hopper railcars, only one had carryback after unloading.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of enhancing release of bulk solids from a surface, the method comprising wetting the surface to provide a treated surface,
   the wetting consisting of applying to the surface a substance consisting of water, a fatty acid, an emulsifier, and a carrier oil.

2. The method of claim 1, wherein the emulsifier consists of one or more surfactants.

3. The method of claim 1, wherein the method further comprises:
   applying the bulk solids to the treated surface; and
   removing the bulk solids from the treated surface, the removing consisting of removing the bulk solids by gravity.

4. The method of claim 1, wherein the bulk solids comprise coal, ore, bauxite, stone, gravel, sand, dirt, phosphate rock, an aggregate, salt, lime, gypsum, fertilizer, thermoplastic polymer pellets, alumina, copper, biomass pellets, hydrated lime, grain, animal feed, seed, or combinations thereof.

5. The method of claim 1, wherein the substance consists of from about 40 wt % to about 90 wt % water, from about 0.2 wt % to about 2 wt % of the fatty acid, from about 0.5 wt % to about 2.5 wt % of the emulsifier, and from about 10 wt % to about 20 wt % of the carrier oil.

6. The method of claim 1, the method further comprising:
   providing a concentrate consisting of the fatty acid, the emulsifier, the mineral carrier oil, and optionally water, wherein the fatty acid is emulsified in the carrier oil; and
   diluting the concentrate with water to form the substance, wherein the carrier oil is emulsified in water.

7. The method of claim 6, wherein the concentrate consists of from about 70 wt % to about 90 wt % of the carrier oil, from about 2 wt % to about 10 wt % of the fatty acid, from about 2 wt % to about 15 wt % emulsifier, and from about 0% to about 3 wt % water.

8. The method of claim 1, wherein the carrier oil is white mineral oil.

9. The method of claim 1, wherein the fatty acid is tall oil fatty acid.

10. The method of claim 1, wherein the surface is an interior surface of a bulk solids container.

11. The method of claim 1, wherein the surface is constructed of metal, polymer, glass, ceramic, or combinations thereof.

12. The method of claim 1, wherein the surface is a surface of a dump truck bed, an interior surface of a chute, an interior surface of a feeder, a surface of a conveyor belt, a surface of a hopper, or a surface of a hopper rail car.

13. The method of claim 1, wherein the substance is applied to the surface at a dose of from about 0.1 gallons to about 50 gallons of the substance per about 2000 square feet of surface, thereby wetting the surface.

* * * * *

UNITED STATES PATENT AND TRADEMARK OFFICE
CERTIFICATE OF CORRECTION

| | | |
|---|---|---|
| PATENT NO. | : 10,882,998 B2 | Page 1 of 1 |
| APPLICATION NO. | : 15/814648 | |
| DATED | : January 5, 2021 | |
| INVENTOR(S) | : Sankar Bhattacharja, John Cranfill III and Ollie O'Neal, Jr. | |

It is certified that error appears in the above-identified patent and that said Letters Patent is hereby corrected as shown below:

On the Title Page

Item [72], Inventors, "John Cranfill, III," should be -- John Cranfill III, --

In the Claims

Column 10, Claim 6, Line 61, "the mineral carrier oil," should be -- the carrier oil, --

Column 11, Claim 7, Line 3, "0%" should be -- 0 wt % --

Signed and Sealed this
Eighth Day of June, 2021

Drew Hirshfeld
*Performing the Functions and Duties of the
Under Secretary of Commerce for Intellectual Property and
Director of the United States Patent and Trademark Office*